Oct. 26, 1954     M. HATTAN     2,692,513
TRANSMISSION
Filed June 22, 1953     3 Sheets—Sheet 1
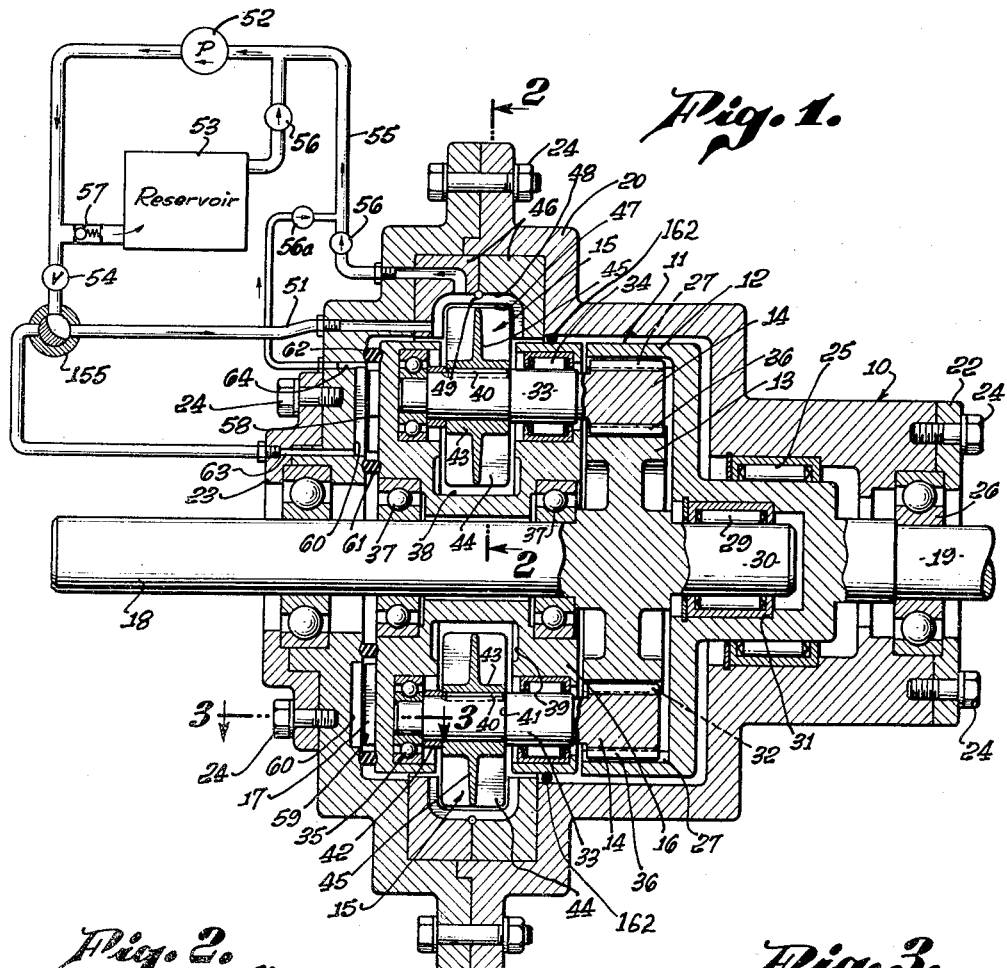
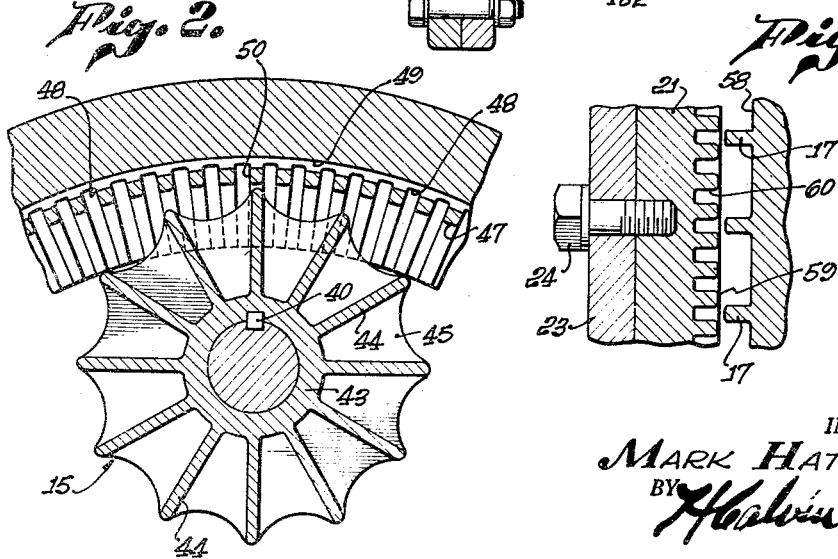
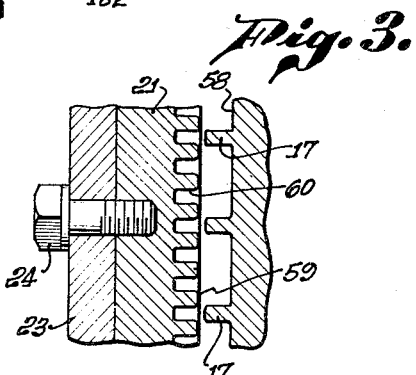
INVENTOR.
MARK HATTAN,
BY H. Calvin White
ATTORNEY.

Oct. 26, 1954  M. HATTAN  2,692,513
TRANSMISSION
Filed June 22, 1953  3 Sheets-Sheet 2

MARK HATTAN,
INVENTOR.

BY [signature]

ATTORNEY.

Oct. 26, 1954

M. HATTAN 2,692,513

TRANSMISSION

Filed June 22, 1953

MARK HATTAN,
INVENTOR.

Patented Oct. 26, 1954

2,692,513

UNITED STATES PATENT OFFICE 2,692,513

TRANSMISSION

Mark Hattan, Pasadena, Calif.

Application June 22, 1953, Serial No. 363,049

1 Claim. (Cl. 74—687)

This invention relates to transmissions typically adapted for use in motor vehicles. The general object of the invention is to provide an improved and highly simplified automatic transmission, which is capable of functioning considerably more effectively and efficiently than prior transmissions, to vary the torque and speed of a driven shaft in accordance with load requirements. As will appear, the present transmissions effect the same type of progressive and continuous variation in torque which is attained by conventional fluid transmissions, but do so in a much more positive and direct manner, which results in greatly reduced power loss and slippage and therefore increased acceleration and efficiency. Further, the transmission is so designed that a single set of gears is actuable easily and without clutching between forward and reverse drive conditions, and preferably also to an overdrive condition, and may safely be put in reverse for braking forward motion is desired.

Structurally, transmissions embodying the invention are of the planetary gear type, including one or a pair of main gears rotatable about a first axis, and a series of revolving planetary gears meshing with the main gear or gears and adapted to both rotate about individual axes and bodily revolve about the axis of the main gears. The novelty of the invention resides in an improved and highly flexible method of controlling the transmission of power through a planetary gear system of this type. Specifically, I control the transmission of power in a forward drive direction by offering controlled resistance to the rotation of the planetary gears about their individual axes, while permitting their unrestrained bodily revolution with the other gears about the main axis of the device. To transmit power in a reverse direction, the planetary gears are freed for unrestrained rotation about their individual axes, and controlled resistance is offered to their bodily revolving movement about the main axis. In a neutral condition, the planetary gears are free for both types of rotation without restraint, so that no power is transmitted between the drive and driven gears.

Preferably, the resistance to planetary gear movement is offered by a control fluid, which may allow a certain amount of slippage during acceleration, to thereby attain the desired automatic and progressive variation of torque and speed. For offering such fluid resistance to the individual rotation of the planetary gears, I may employ a number of vaned rotors, which revolve and rotate in accordance with the planetary gears, and whose rotation is restrained by introducing control fluid into contact with the rotor vanes. Reaction shoulders or grooves may be provided in a stationary housing wall adjacent the vaned rotors, to resist bodily movement of the fluid with the rotors.

In the reverse condition of the device, I may resist bodily revolving movement of the planetary gears by providing fluid engageable vanes on a rotating carrier by which the planetary gears are carried. Fluid is introduced into the transmission housing in contact with these vanes when the reverse drive condition is desired. As in the case of the forward drive rotors, I may provide stationary reaction shoulders or grooves in the housing wall adjacent the reversing vanes, against which the fluid displaced by the vanes may react.

In driving a vehicle or other piece of equipment from a diesel engine, gasoline turbine, or any of various other types of engine, it may be desirable to set the engine at a particular efficient operating speed, and then vary the speed of the output shaft solely by controlling the transmission. The present transmission is especially desirable for this type of control, since the speed in both forward and reverse directions may be regulated by merely varying the resistance to the planetary gear movement. Where fluid resistance is employed, this control may be effected by varying the amount of fluid in contact with the vanes. It is contemplated that this variation in resistance may be controlled automatically in accordance with load requirements, to render the transmission completely automatic.

In the forward drive condition of the apparatus, when the resistance to rotation of the planetary gears about their individual axes has reached a point at which the rotation is completely stopped, power is transmitted between the drive and driven shafts in a 1 to 1 speed ratio. For overdrive, the resistance to movement of the planetary gears is further increased, to a point at which those gears actually commence to turn in a direction the reverse of their normal direction of rotation, this reverse rotation being effected by the action of the fluid or other resistance medium as a result of the bodily revolving movement of the planetary gears.

It is also noted that the present type of transmission is adapted for free wheeling, since the fluid or its equivalent may offer great resistance to planetary gear rotation in one direction, but relatively little resistance to rotation in the opposite direction, so that power cannot be transmitted backwards from the normally driven shaft to the drive shaft. It is felt that this feature of the transmission will render it especially desirable for transmitting power between a gasoline turbine and a driven propeller in a turbo-prop airplane installation. In such turbo-prop power systems, great damage has been caused in the past by the tendency of the propeller to turn the turbine if the latter ceases to function properly. An effective free wheeling arrangement would eliminate this damage.

All the various features and objects of the invention, as well as the details of certain typical embodiments, will be understood more clearly from the following description of the accompanying drawings, in which:

Fig. 1 is a general view taken in longitudinal axial section illustrating one embodiment of the invention;

Fig. 2 is an enlarged fragmentary section on line 2—2 of Fig. 1;

Fig. 3 is a fragmentary view taken at the housing and carrier interface;

Figure 4:
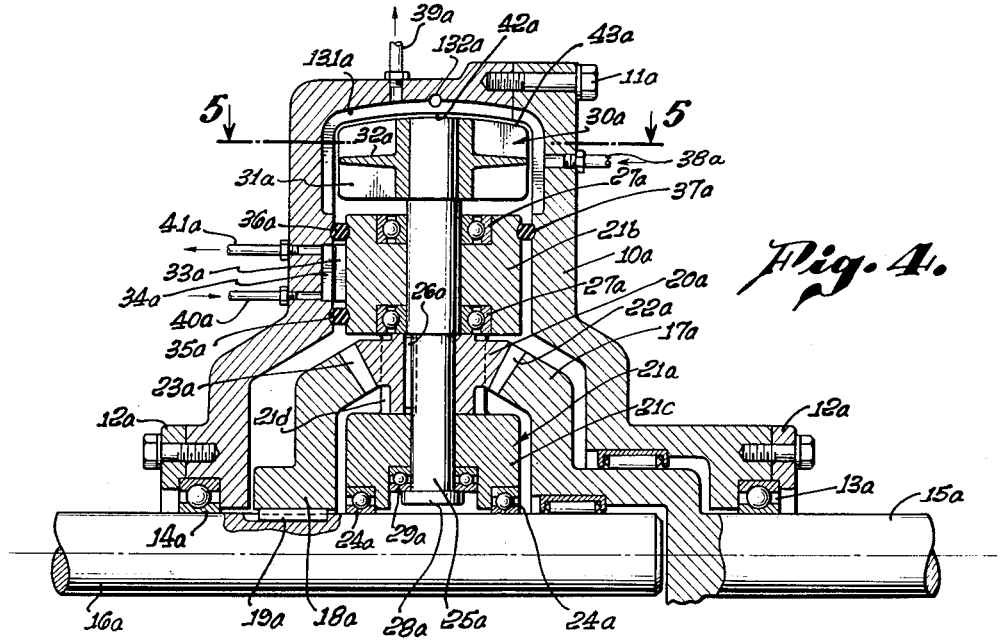
Fig. 4 is a view similar to Fig. 1 illustrating a variational form of the invention.

The first form of the invention illustrated in Figs. 1 to 3, includes a transmission housing 10 containing a planetary gear assembly 11, including a ring gear 12, a sun gear 13, and a series of planetary gears 14 adapted to revolve about the axis of gears 12 and 13. Connected to each of the planetary gears is a vaned rotor or paddle wheel 15, against which braking force is exerted by fluid contained within the housing, to retard rotation of the planetary gears about their individual axes. The planetary gears and paddle wheels are carried by a rotary carrier 16, to a side of which are mounted a series of vanes 17, against which fluid contained in the housing exerts a braking force retarding bodily rotation of the carrier. As will be brought out in greater detail at a later point, the variation of the braking force exerted against vaned rotors 15 acts to vary the rate at which sun gear 13 and driven shaft 18 are rotated by the ring gear 12 and drive shaft 19. Exertion of braking force against vanes 17, on the other hand, acts to reverse the rotation of driven shaft 18 as compared with drive shaft 19.

Housing 10 is preferably formed sectionally, as shown, of a pair of main sections 20 and 21, and a pair of transverse end plates 22 and 23, all suitably secured together by bolts 24. Drive shaft 19 projects from a first end of housing 10, and is connected to the engine of the vehicle of which the illustrated transmission is a part. Driven shaft 18 projects from a second end of the housing for connection to the wheel driving mechanism of the vehicle, and of course is axially alined with drive shaft 19.

Shaft 19 is journalled for rotation relative to housing 10 by roller bearings 25, and ball bearings 26. Ring gear 12 of the planetary assembly is preferably formed integrally with and of course axially alined with shaft 19, and has a series of radially inwardly facing axially extending teeth 27 formed in its inner wall. Driven shaft 18 is journalled for rotation in the housing by roller bearings 29 interposed between an inner projection 30 of the shaft and a cylindrical wall 31 formed in an enlarged portion of the drive shaft 19. Sun gear 13 may be formed integrally with shaft 18, and is alined axially with the two shafts 18 and 19 and ring gear 12. The sun gear has on its radially outer surface a series of axially extending teeth 32 facing toward teeth 27 of the ring gear.

The planetary gears 14 have shaft portions 33, which extend parallel to shaft 18 at locations evenly spaced circularly thereabout, and which are journalled in bearings 34 and 35 carried by carrier 16, to mount the planetary gears for rotation about individual axes spaced about the main axis of the transmission. Each of the planetary gears of course has a series of axially extending teeth 36 spaced thereabout, which teeth are shaped in correspondence with and mesh with the teeth 27 and 32 on gears 12 and 13. As will be understood, planetary gears 14 are rotatable about their individual axes relative to gears 12 and 13, and are rotatable with those gears about the axis of shafts 18 and 19.

Carrier 16 is essentially annular in shape, and is mounted for rotation about shaft 18 by a pair of ball bearings 37. The carrier contains individual recesses 38 for receiving the various paddle wheels 15 associated with planetary gears 14. The radially inner portion of each of these recesses is circularly curved essentially in correspondence with the contained paddle wheel. Each of the recesses 38 may be laterally increased in dimension about its periphery at 39.

There may typically be five of the individual planetary gears 14 and rotors 15. These rotors are rigidly carried by planetary gear shafts 33, being typically retained against rotation relative to the shafts by keys 40. Each of the rotors 15 may abut at one side against a shoulder 41 on the corresponding shaft 33, and be axially spaced at the second side from bearings 35 by a spacer sleeve 42. Rotors 15 have hub portions 43 for reception about shafts 33, and each includes a series of circularly spaced radially extending vanes 44, preferably interconnected by circularly extending webs 45.

Outwardly of vaned rotors 15, housing 10 stationarily carries a pair of reaction rings 46, which are centered about the axis of shafts 18 and 19, and which form together an annular inwardly facing recess 47 of essentially rectangular configuration. The outer portions of rotors 15 extend into recess 47, and are spaced a very small distance from the walls of that recess. In the wall of recess 47, rings 46 contain a series of circularly spaced grooves 48, which extend axially along the outer sides of rotors 15 and then radially inwardly along the opposite axial sides of the rotors. All of the grooves 48 are interconnected for fluid communication therebetween by an annular passage 49 formed in rings 46 at the radially outermost extent of the axially central portions of the grooves.

The walls of grooves 48 formed in reaction rings 46 are desirably so shaped as to comprise shoulders 50 extending substantially directly transversely of the direction of movement of the nearest portions of rotors 15, when rotors 15 are turned about their individual axes. Consequently, if a liquid, such as oil is introduced into recess 47 of rings 46, vanes 15 tend to displace the liquid against transverse shoulders 50, so that the liquid sets up a resistance to rotation of rotors 15 and planetary gears 14 about their individual axes. For setting up such a resistance to rotation of the rotors, I introduce liquid into housing 10 through a passage 51, to which the liquid is supplied under pressure by a pump 52 drawing liquid from a reservoir 53. A control valve 54 is connected into the fluid supply line from the pump, to vary the rate of fluid delivery into the housing through passage 51. Fluid from the housing is returned to the pump through a housing passage 55, leading from one of the grooves 50 in rings 46. The pump thus takes suction from both reservoir 53 and the recess 47 in the housing, preferably through check valves 56.

When control valve 54 is closed, pump 52 discharges back to reservoir 53 through a spring urged by-pass or relief valve 57. As will be understood, with control valve 54 closed, the pump acts to withdraw all liquid from within housing recess 47, so that there is no fluid resistance to rotation of rotors 15 about their individual axes. If valve 54 is then opened to a certain extent, a controlled amount of liquid from pump 52 is allowed to flow into recess 47, to retard individual rotation of rotors 15, so that power is transmitted to shaft 18. Centrifugal force of rotors 15 urges any liquid which may be present toward the radially outer portion of recess 47, and the greater the opening of valve 54, the farther the liquid within recess 47 extends radially inwardly within that recess.

The previously mentioned vanes 17, for retarding bodily rotation of planetary gear carrier 16 are rigidly attached to a radially extending end wall 58 of the carrier at locations spaced circularly about the axis of shaft 18. These vanes extend radially outwardly from the shaft axis, and have side edges received in closely proximate relation to an adjacent radially extending wall 59 of the housing. This housing wall contains a series of radially extending grooves 60 past which vanes 17 move, and whose side walls form transverse shoulders against which fluid is deflected by vanes 17 upon rotation of carrier 16.

It will be apparent that when liquid is contained within the housing in contact with vanes 17, the tendency of these vanes to deflect the liquid against the side walls of grooves 60 sets up a resistance to bodily rotation of carrier 16, which resistance increases as the amount of liquid engaging vanes 17 increases. To isolate liquid engaging vanes 17 from the liquid engaging rotors 15, I provide a pair of annular seal rings 61 and 62 between the carrier and housing wall at locations radially inwardly and outwardly of vanes 17. Rotation of the carrier and its vanes 17 of course tends to throw whatever liquid is received between seal rings 61 and 62 radially outwardly against the latter of these rings. Ring 62 coacts with a third seal ring 162 positioned between the housing and carrier at the opposite side of rotors 15 to retain the rotor engaging liquid in the desired portion of the housing.

Liquid is supplied to the space between rings 61 and 62 through a body passage 63, which may receive liquid from pump 52 under the control of valve 54. A selector valve 155 determines whether the liquid from valve 54 flows through line 51 to rotors 15 as previously discussed, or through passage 63 to vanes 17 for reversing. Liquid from the space between rings 61 and 62 leaves the housing through a housing passage 64, communicating with pump 52 through check valve 56a.

In discussing the operation of the transmission of Figs. 1 to 3, assume first a neutral condition, in which drive shaft 19 is turning, but no power is being transmitted to shaft 18. In this condition of the apparatus, no liquid is received within the housing in contact with rotors 15 or vanes 17, so that carrier 16 rotates in the same direction as driving gear 12, while the planetary gears 14 and rotors 15 freely rotate about their individual axes and simultaneously revolve with the carrier about shaft 18.

If it is desired to transmit rotation to shaft 18 in the same direction that shaft 19 is turning (to drive the vehicle forwardly), selector valve 155 is set to pass liquid through line 51 into contact with vaned rotors 15, with valve 54 opened to pass a desired flow of liquid. The pump, associated valves, and other parts are so constructed that the liquid tends to build up in recess 47, to thus retard rotation of vaned rotors 15 about their individual axes. As will be understood, the opening of valve 54 may be varied, to vary the amount of liquid which is present in recess 47, and to thereby vary the fluid resistance to turning of rotors 15 about their individual axes.

When the rotation of planetary gears 14 about their individual axes is retarded or virtually prevented by the action of the fluid against rotors 15, planetary gears 14 commence to revolve bodily at an increased rate in the direction in which shaft 19 is turning. This increased bodily rotation of planetary gears 14 about the main axis of the transmission, and the decreased rate of rotation of the gears about their individual axes, results in the transmission of a turning force to sun gear 13 and the driven shaft 18. The rate at which shaft 18 turns relative to the rate of rotation of shaft 19 of course varies with changes in the amount of liquid accumulated within recess 47, and thus the extent to which valve 54 is opened. It is also noted that even though the amount of liquid within recess 47 is maintained constant, the transmission acts to automatically vary the effective gear ratio between the drive and driven shafts, in accordance with load changes, and during acceleration or deceleration. Further, the transmission of power through the liquid is extremely positive and direct, because of the high relative velocities between rotors 15 and the grooved housing wall. As will be understood, the high velocities are attained in part by virtue of the difference in diameter between the planetary gears and drive gear 12, which acts to gear up the rotor velocities, and in part as a result of compounding the two types of rotation of the rotors.

When it is desired to drive shaft 18 in a direction the reverse of the direction in which shaft 19 is turning, valve 155 is reversed to shut off the flow of liquid to rotors 15, and admit liquid into contact with vanes 17 and housing groove 60. This liquid retards bodily rotation of carrier 16 and planetary gears 14 about the axis of shaft 18, with resultant driving of shaft 18 in the desired reverse direction. The rate of turning of shaft 18 in the reverse direction may be varied by controlling the opening of valve 54.

Figure 5:
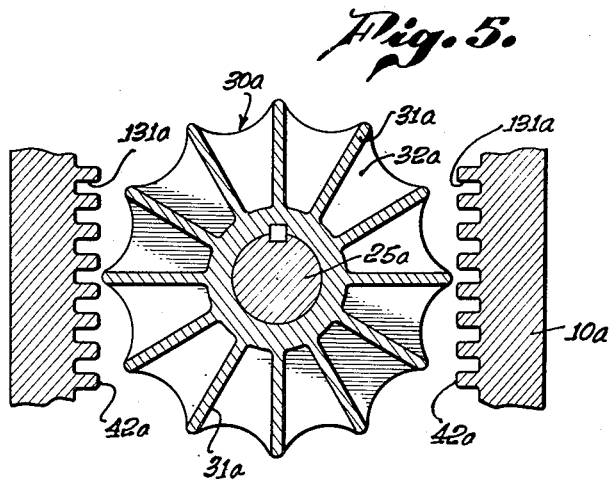
Fig. 5 is a cross section on line 5—5 of Fig. 4.

Figs. 4 and 5 illustrate a variational form of the invention, which is essentially the same as that of the first three figures, except that it employs bevel gears rather than the sun and ring gear arrangement of the first form. This second device includes a housing 10a formed of two sections joined together by a series of circularly spaced bolts 11a. At its opposite ends, the housing has a pair of end plates 12a retaining bearings 13a and 14a for journalling the drive and driven shafts 15a and 16a respectively. The drive shaft 15a carries a first bevel gear 17a, while the second bevel gear 18a is carried by driven shaft 16a. Gear 18a is suitably retained against rotation relative to shaft 16a, as for instance by key 19a. The two bevel gears 17a and 18a mesh at 22a and 23a with a series of planetary circularly spaced bevel pinions 20a, rotatably mounted to a rotatable annular carrier 21a.

Carrier 21a is mounted by a pair of bearings 24a for rotation about shaft 16a. Pinions 20a are mounted by individual shafts 25a to carrier 21a for rotation about individual axes extending radially outwardly from the axis of shaft 15a and 16a at circularly spaced locations. Carrier 21a includes an annular radially outer portion 21b and an annular radially inner portion 21c connected by radial webs 21d. Pinions 20a are received radially between the outer and inner portions 21b and 21c of the carrier. The pinions are of course suitably retained against rotation relative to their individual shafts 25a, as by keys 26a. Shafts 25a are journalled in outer portion 21b of the carrier by a pair of bearings 27a, and are retained against radially outward movement by engagement of inner heads 28a of the shafts against ball thrust bearings 29a.

At its outer end, each of the shafts rigidly carries a rotary paddle wheel 30a, having a number of circularly spaced vanes 31a joined by webs 32a. Opposite paddle wheels 30a, the inner wall of housing 10a contains a series of transverse grooves 131a extending about the radially outer and opposite axial sides of the paddle wheels. The walls of these grooves 131a of course serve as transverse shoulders against which fluid is displaced by wheels 30a, when liquid is contained in the grooved portion of the housing. All of the grooves 131a are preferably interconnected for fluid flow therebetween by an annular passage 132a.

At one of its sides, carrier 21a carries a series of circularly spaced radially extending vanes 33a, coacting with radially extending grooves 34a in the housing wall offering fluid resistance to bodily rotation of the carrier. Seal rings 35a, 36a and 37a seal off the fluid receiving spaces containing rotors 30a and vanes 33a. A control liquid is admitted into the portion of the housing containing rotors 30a through an inlet line 38a and is discharged through line 39a. Similarly, lines 40a and 41a admit liquid to and discharge it from the space containing vanes 33a. The fluid supply and discharge connections to lines 38a, 39a, 40a and 41a are the same as in the Fig. 1 form of the invention.

In order to transmit power through the Fig. 4 transmission in a forward direction, liquid is admitted into the housing through line 38a, to contact the vanes of rotors 30a, and resist rotation of those rotors. To reverse the direction of the drive, the liquid is drawn off from contact with rotors 30a through line 39a, and is admitted through line 40a into contact with the reversing vanes 33a. Both the forward and reverse controls are continuously variable by controlling the amount of liquid contained in the housing.

In order that the outermost edge portions of rotors 30a may be received in closely proximate relation to the grooved outer wall 42a of the housing, it is noted that the outer edge portions of the rotors and the innermost portions of grooved wall 42a lie in closely proximate spherical planes centered about the axis of shafts 15a and 16a.

Figure 6:
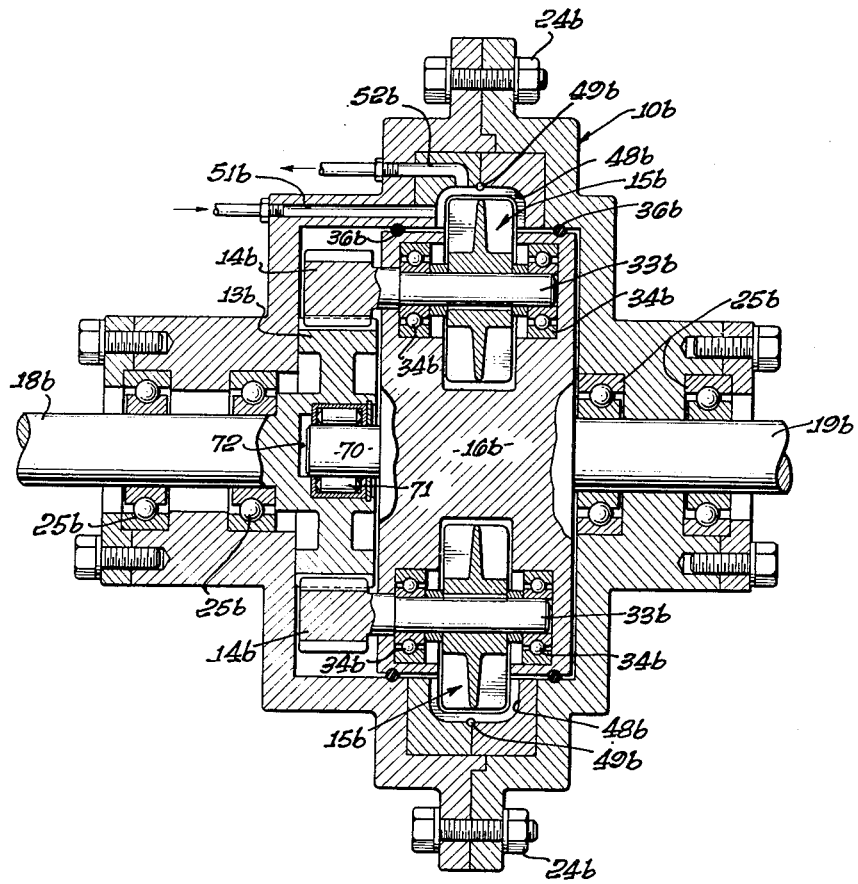
Fig. 6 is a view similar to Fig. 1 illustrating a third embodiment of the invention.

Fig. 6 represents a variational form of the invention corresponding essentially to the Fig. 1 form, except as to the elimination of one of the main gears of the transmission. The Fig. 6 device includes a housing or case 10b formed of two sections bolted together at 24b. Extending into opposite ends of housing 10b are the drive shaft and driven shafts 19b and 18b respectively, which are journaled in the housing within bearings 25b. A planet carrier 16b is rigidly attached to the inner end of drive shaft 19b for rotation therewith. Driven shaft 18b rigidly carries an externally toothed gear 13b constructed in accordance with gear 13 of Fig. 1. Planet carrier 16b may have an axial projection 70 journaled in bearings 71 within a bore 72 in gear 13b.

A series of circularly spaced planetary gears 14b mesh with gear 13b at different locations about its periphery, and are rigidly carried by individual shafts 33b journaled in bearings 34b within carrier 16b. Gears 14b and their shafts 33b are thus mounted for rotation with carrier 16b and drive shaft 19b about the main axis of the transmission, and are also mounted for individual rotation about the axes of shafts 33b which extend parallel to shaft 19b.

Each of the shafts 33b carries a vaned rotor 15b such as that shown at 15 in Fig. 1. Housing 10b contains a circular series of reaction grooves 48b in its inner wall corresponding to grooves 48 of Fig. 1, and into which liquid displaced by rotors 15 tends to move. Grooves 48b are interconnected by an annular passage 49b, and liquid is introduced into and out of the grooved portion of the housing through inlet passage 51b and outlet passage 52b. The fluid supply and control system for the Fig. 6 form of the invention may correspond essentially to that of Fig. 1, except that the selector valve 155 and the fluid connections to the reversing apparatus are eliminated.

In utilizing the transmission of Fig. 6, shaft 19b is driven by a suitable motor or other power source, while shaft 18b transmits output power to a mechanism which is being driven by the transmission. As will be understood, when no liquid is present within grooves 48b in the housing wall, rotors 15b and the attached planetary gears 14b are free to rotate about their individual axes, and no power is transmitted to output shaft 18b. If however, liquid is admitted into the grooved portion of the housing, through inlet 51b, the resulting resistance to rotation of rotors 15b causes power to be transmitted to gear 13b and shaft 18b. This last form of the invention therefore has most of the advantages of the first two forms, except for the capacity for reversal. If desired, a pair of seal rings 36b may be positioned between and in engagement with carrier 16b and the housing wall at opposite sides of the vaned rotors, to prevent escape of the rotor engaging liquid from within the grooved portion of the housing.

I claim:

An automatic transmission comprising a pair of alined drive and driven gears relatively rotatable about a first axis, a planetary gear meshing with said drive and driven gears for transmission of power therebetween and mounted to bodily revolve with said gears about said axis and to rotate individually about a second and different axis, a carrier mounting said planetary gear for rotation about said second axis and bodily rotatable with said planetary gear about said first axis, first control means offering controlled fluid resistance to the rotation of said planetary gear about said second axis, and additional control means offering controlled fluid resistance to the rotation of said carrier about said first axis, said first control means include a vaned rotor revolving and rotating in accordance with the revolution and rotation of said planetary gear, and means introducing liquid into contact with the vanes of said rotor and thereby resisting rotation of the rotor, said additional control means comprising additional vanes turning with said carrier, and means introducing liquid into contact with said additional vanes, said transmission including a housing containing all of said gears, said rotor and said additional vanes, means forming in the housing two annular series of stationary reaction grooves contered about said first axis and positioned adjacent said rotor and said additional vanes respectively to resist displacement of liquid thereby, and seal means in the housing isolating the liquid contacting said rotor from the liquid contacting said additional vanes.

References Cited in the file of this patent

UNITED STATES PATENTS

| Number | Name | Date |
| --- | --- | --- |
| 1,273,326 | Bugenhagen | July 23, 1918 |
| 1,504,583 | Streeter et al. | Aug. 12, 1924 |
| 1,537,085 | Ingemarson | May 12, 1925 |
| 1,689,537 | Sorenson | Oct. 30, 1928 |
| 2,079,691 | Joyce | May 11, 1937 |
| 2,183,403 | Mitchell | Dec. 12, 1939 |
| 2,332,436 | Campbell | Oct. 19, 1943 |

FOREIGN PATENTS

| Number | Country | Date |
| --- | --- | --- |
| 252,568 | Italy | Mar. 25, 1927 |
| 445,596 | France | Oct. 18, 1912 |
| 1,030,000 | France | June 9, 1953 |